July 22, 1941.  K. C. RANDALL  2,249,853
TROLLEY SYSTEM CONTROL
Filed Feb. 21, 1940  2 Sheets-Sheet 2
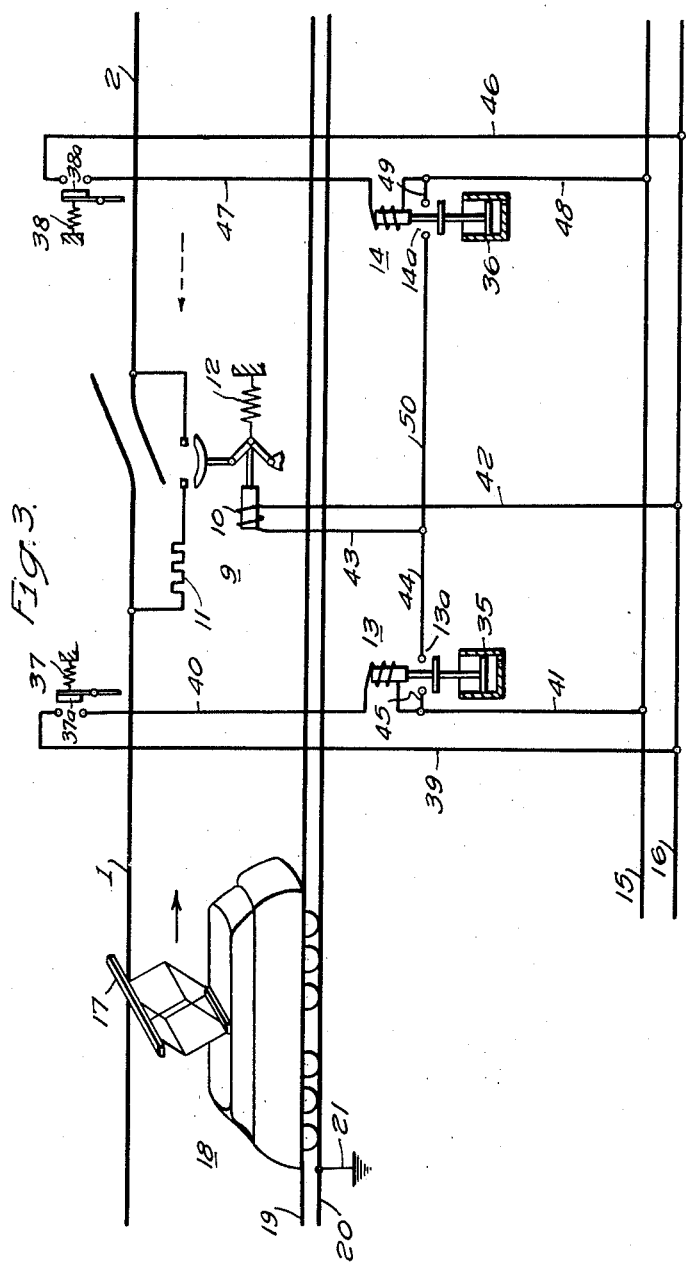
WITNESSES:
INVENTOR
Karl C. Randall
BY
ATTORNEY Patented July 22, 1941

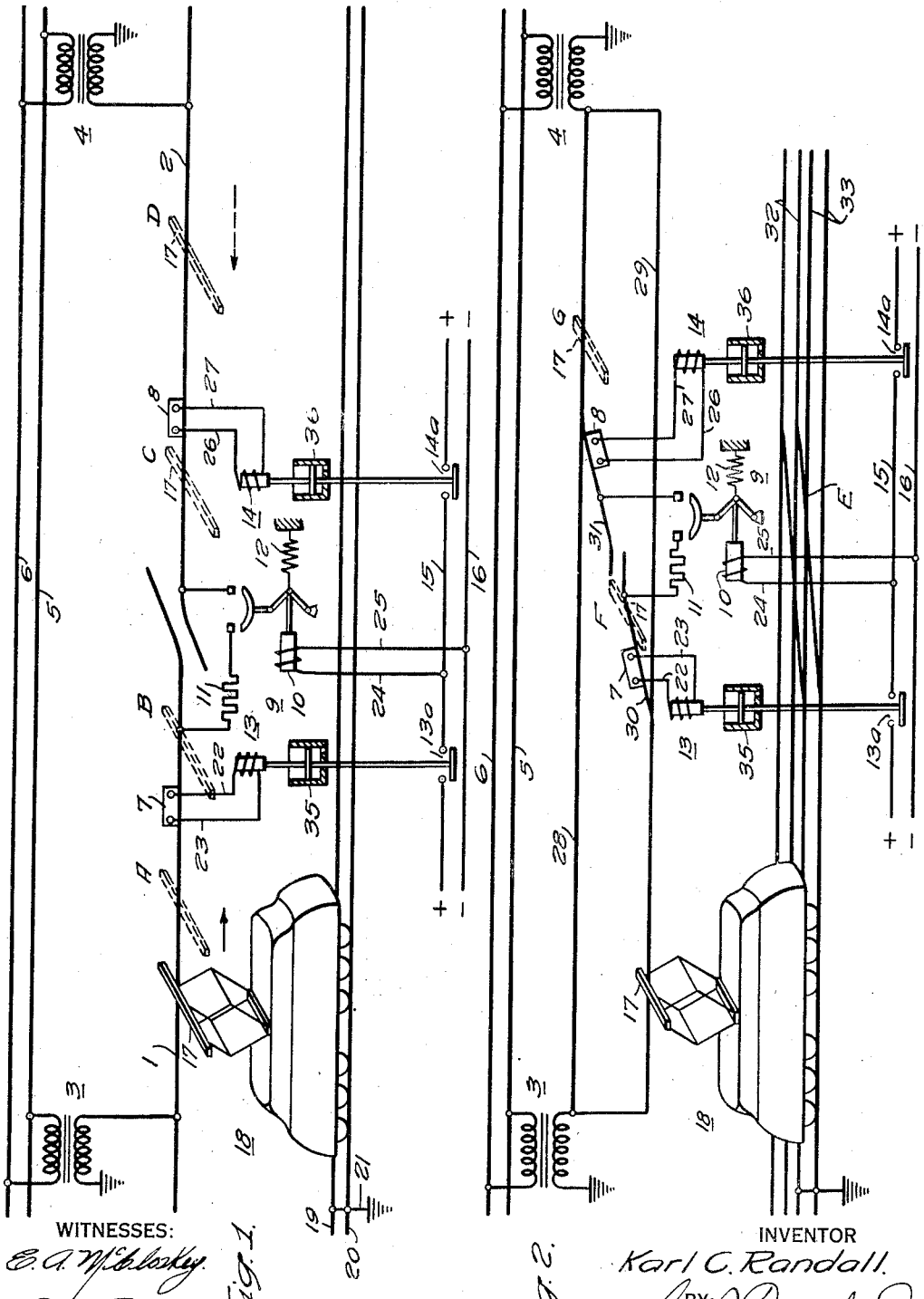

2,249,853

UNITED STATES PATENT OFFICE 2,249,853

TROLLEY SYSTEM CONTROL

Karl C. Randall, Edgewood, Pa., assignor to Westinghouse Electric & Manufacturing Company, East Pittsburgh, Pa., a corporation of Pennsylvania Application February 21, 1940, Serial No. 320,067

15 Claims. (Cl. 191—6)

My invention relates generally to control systems, and has particular reference to control systems for electric railway trolley systems.

It is well known that the potential at any point along a trolley system which is sectionalized into a plurality of independently operated sections in accordance with standard practice varies in proportion to the amount of power required to supply the track loading of each such section. When the current collecting device reaches the end of one trolley section in passing to an adjacent section, severe arcing may often occur between the current collector and the trolley sections because of the difference in potential between the two trolley sections. When one section is loaded quite heavily in comparison to its adjacent section, the arc drawn by the movement of the current collector may continue between the two trolleys and cause considerable damage to the trolley system before it can be extinguished.

It is a general object of this invention to provide a trolley system control in which the current collecting device of an electric locomotive may pass from one trolley section to a normally independently operated adjacent section without causing an arc-over between the two sections, thereby preventing damage to both the current collecting device and the trolley system.

A more specific object of my invention is to provide for connecting adjacent trolley sections for operation in parallel as the current collecting device of an electric locomotive is changing over from one section to another.

A further object of my invention is to provide a trolley control system in which a tie breaker for paralleling adjacent trolley sections is closed when the current collecting device of a locomotive reaches a preselected control point on the trolley in advance of making a change-over from one trolley section to an adjacent trolley section, the breaker thereafter being opened to restore the adjacent trolleys to independent operation when the current collector has passed a second control point on the adjacent trolley subsequent to the completion of the change-over.

A still further object of my invention is to provide a trolley control system in which the operation of a tie circuit breaker is controlled by changes in trolley current and functions to connect adjacent trolley sections for operation in parallel when the pantograph of a locomotive is passing from one to the other of said sections and thereafter to disconnect the parallel connection when the change-over to the other trolley by the pantograph has been completed.

Still another object of my invention is to provide a trolley system control in which a pair of normally independently operated stub trolleys feeding a track cross-over are connected for operation in parallel to prevent arc occurrence when the pantograph of a locomotive traversing the cross-over is changing over from one to the other of said stub trolleys.

The foregoing and other objects of my invention will be apparent from the following detailed description and from the accompanying drawings, in which:

Figure 1 is a diagrammatic drawing illustrating a preferred embodiment of my invention, as applied to adjacent trolley sections of an alternating current trolley system.

Fig. 2 is also a diagrammatic view in which my invention is applied to a pair of branch or stub trolleys of an alternating current trolley system feeding a cross-over between adjacent tracks, and Fig. 3 is a modification of the embodiment of Fig. 1.

Referring now to Fig. 1, a pair of trolleys 1 and 2 are shown connected through transformers 3 and 4, respectively, for energization from any suitable source of potential such, for example, as supply conductors 5 and 6. A pair of electro-responsive devices 7 and 8 which may, for example, be similar in principle of operation to a current transformer are utilized with the trolleys 1 and 2, respectively, and function in response to changes in trolley current to control the operation of a tie circuit breaker 9 which, when closed, ties trolleys 1 and 2 in parallel. If desirable, a current limiting resistor 11 may be inserted in the tie conductor.

The circuit breaker 9 may be of any well known type. For purposes of simplicity in illustration, however, the breaker shown includes a closing solenoid 10 which operates when energized to close its breaker contacts against an opposed biasing action of a spring 12, which functions to move the breaker to an open position when the solenoid 10 is deenergized.

Relays 13 and 14 are utilized for controlling the energization of the solenoid 10 of tie breaker 9 from an auxiliary power supply such as conductors 15 and 16 and may, if desirable, be provided with time delay means such as dash-pot members 35 and 36, respectively, to delay the opening of relay contacts 13a and 14a.

A current collecting device which may be of any suitable type such, for example, as pantograph 17 of a locomotive 18 takes current from the trolleys 1 or 2 for the operation of the motors of the locomotive, the return current being carried through track rails 19 and 20 and ground 21 in accordance with standard practice.

The system in Fig. 1 operates as follows.

When the pantograph 17 of locomotive 18 proceeding in the direction indicated by the solid arrow reaches position B, the current through the portion of trolley 1 which includes the device 7 will be increased by the load current drawn by pantograph 17, and such increase in current will cause a potential to be produced in the device 7 which when impressed across the winding of relay 13 through conductors 22 and 23, will be sufficient to cause relay 13 to operate and close relay contacts 13a. When relay contacts 13a are thus closed, a circuit will be established for energizing the operating solenoid 10 of the circuit breaker 9 from auxiliary source conductors 15 and 16 through conductors 24 and 25, causing the operating mechanism of tie breaker 9 to move to a closed position and connect trolleys 1 and 2 for operation in parallel.

With trolleys 1 and 2 now operating in parallel pantograph 17 will also draw current from trolley 2, and such current increase in trolley 2 will likewise cause a potential to be produced in device 8 which is impressed on the winding of relay 14 through conductors 26 and 27, causing relay contacts 14a to close and establish a circuit in parallel with that effected by the closure of relay contacts 13a for energizing the closing coil 10 of the breaker 9.

When the pantograph 17 completes the change-over from trolley 1 to trolley 2 and proceeds along trolley 2 such as indicated by position D, the load current drawn thereby will be furnished for the most part from that portion of trolley 2 to the right of device 8 and the resultant decrease in current through the end portions of trolleys 1 and 2 which includes the devices 7 and 8, respectively, will decrease the potential available across such devices sufficiently to open relay contacts 13a and 14a, respectively. The closing coil 10 of the breaker 9 will now be de-energized and the operating mechanism thereof will move to an open position and break the parallel connection between trolleys 1 and 2, thereby restoring the trolleys to independent operation.

In the event that conditions of trolley potential on either of the trolleys 1 and 2 during the time that the pantograph 17 is changing over from one of the said trolleys to the other are such that while operating in parallel the potentials obtained on the devices 7 and 8 are insufficient to keep either of the relays 13 or 14 in a closed position, time delay means 35 and 36, will function to delay the opening of relay contacts 13a and 14a, respectively, until the pantograph 17 has had sufficient time to complete the change-over between trolleys 1 and 2.

It will, of course, be understood that my control system will operate equally as well with the locomotive moving in the opposite direction, indicated by the dotted arrow, in which case the electro-responsive device 8 will function to initiate a closure of the tie breaker 9 when the pantograph 17 has reached position C, and which will remain in a closed position until the pantograph 17 has reached position A.

In Fig. 2, I have shown my invention as applied to a pair of trolleys 28 and 29 which feed parallel tracks 32 and 33, and which are connected to any trolley potential supply source such, for example, as feeder conductors 5 and 6 through transformers 3 and 4 at spaced feed-in points, which may be in the order of 10 or 15 miles apart. To supply current for the track cross-over E, a pair of stub or branch trolleys 30 and 31 are extended from main trolleys 28 and 29, respectively, and terminate in overlapped relation at approximately the center of the cross-over.

The differential in voltage between stub trolleys 30 and 31 feeding track cross-over E will be dependent upon the instantaneous loading characteristics of the two main trolleys 28 and 29 throughout the entire distance between the feed-in transformers 3 and 4. In order to prevent any arc-over between the pantograph 17 and the trolleys as the pantograph changes over from one to the other of the stub trolleys 30 and 31 at the cross-over section E, I have provided a tie circuit breaker 9 and control therefor similar to that utilized in Fig. 1.

As explained in connection with the operation of the control system shown in Fig. 1, when pantograph 17 reaches position F, the circuit breaker 9 will move to a closed position and connect trolley stubs 30 and 31 and hence main trolleys 28 and 29 in parallel. When the pantograph 17 reaches position G, the circuit breaker 9 will open and restore the stub and main trolleys to their normal operation independent of each other.

In Fig. 3, which is a modification of the embodiment of my invention illustrated in Fig. 1, a pair of target contactors 37 and 38 are supported in the trolley structure in any suitable manner and are actuated by the moving pantograph 17 in advance of a changeover from trolley 1 to trolley 2 for controlling the operation of the tie breaker 9.

When the pantograph 17 of the locomotive 18, moving in the direction indicated by the solid arrow, trips the target contactor 37, its contacts 37a close momentarily and establish a circuit from auxiliary potential source conductors 15 and 16 to energize the winding of relay 13. This circuit may be traced from conductor 16 of the supply source through conductor 39, contacts 37a, conductor 40, the winding of relay 13, and conductor 41 to the other conductor 15 of the supply source.

When the winding of relay 13 is thus energized, its contacts 13a will close and establish a circuit for energizing the closing coil 10 of the tie breaker 9 which may also be from auxiliary source conductors 15 and 16. This circuit may be traced from conductor 16 through conductor 42, breaker closing coil 10, conductors 43 and 44, relay contacts 13a and conductors 45 and 41 to source conductor 15.

Energization of the breaker closing coil 10 will cause the operating mechanism of the breaker to move to a closed position and connect trolleys 1 and 2 for operation in parallel.

The contractor 37, which is biased to an open position, will open contacts 37a after the pantograph 17 has passed its location on the trolley causing the circuit between source conductors 15 and 16 and the winding of the relay 13 to be interrupted. However, relay 13 is provided with any suitable time delay means such, for example, as dashpot 35, which functions to delay the opening of relay contacts 13a until the pantograph 17 has had sufficient time to complete the change-over to trolley 2.

When a locomotive is passing along trolley 2 in the direction indicated by the dotted arrow, the pantograph 17 will actuate contactor 38 and establish a circuit for energizing the winding of relay 14 from the conductors 15 and 16 through a circuit which may be traced from conductor 16 through conductor 46, contacts 33a, conductor 47, the winding of relay 14, and conductor 48 to conductor 15.

With the winding of relay 14 thus energized, its contacts 14a will close and establish a circuit for energizing the closing coil 10 of the breaker 9 from source conductors 15 and 16. This circuit may be traced from conductor 15 through conductors 48 and 49, relay contacts 14a, conductors 50 and 43, closing coil 10 and conductor 42 to source conductor 16.

Relay 14, like relay 13, is provided with time delay means, such as dashpot member 36, which functions to keep relay contact 14a closed until the pantograph 17 has had sufficient time to make the transition from trolley 2 to trolley 1.

Although the present embodiments of my invention have been illustrated as applied to an alternating current trolley system, it will be evident that they can be applied equally as well to a direct current system, in which case transformers 3 and 4 would obviously be replaced by a source of direct current supply such, for example, as rotary converters or rectifier devices. In a direct current system, the electro-responsive devices 7 and 8 could, for example, be in the form of a shunt inserted in the trolley wire itself, and the voltage drop caused by the trolley current passing through the shunt could be utilized for energizing the windings of relays 13 and 14.

In conclusion, it will be evident that various other changes and modifications may be made in my invention without departing from the spirit and scope thereof, and I, accordingly, desire that only such limitations as are made necessary by the prior art be placed upon the appended claims.

I claim as my invention:

1. In a trolley system including a plurality of trolley sections, the end portions of adjacent sections being overlapped in spaced relationship to permit uninterrupted current flow to a current collecting device, mean for energizing said trolley sections for normal operation independent of each other, means for paralleling said adjacent trolley sections in advance of a changeover by said current collector from one to the other of said adjacent trolley sections, and means for restoring said adjacent trolley sections to independent operation after said changeover has been completed.

2. The combination with a trolley system including a plurality of trolley sections, and means for energizing adjacent trolley sections simultaneously for normally independent operation, of tie breaker means for connecting adjacent trolley sections for operation in parallel while a current collector is changing over from one to the other of said adjacent trolleys, and control means for said tie breaker operable in accordance with the movement of said current collector.

3. In a trolley system, including a plurality of trolley sections, said sections being arranged substantially in end to end relationship, and means for energizing each of said trolleys for normal independent operation, the combination of a tie breaker for connecting adjacent trolley sections for parallel operation when a current collector device is changing over from one to the other of said adjacent trolley sections, and control means responsive to the flow of current in said adjacent trolleys for controlling the opening and closing operations of said tie breaker.

4. The combination with a trolley system including a plurality of trolley sections spaced in substantially end to end relationship and means for energizing adjacent trolley sections simultaneously for normal independent operation, of tie breaker means for connecting adjacent trolley sections in parallel when a locomotive current collector is changing over from one to the other of said adjacent trolleys, and means operable when said locomotive current collector reaches preselected control positions on said trolley sections for controlling the operation of said tie breaker means.

5. The combination with a trolley system including a plurality of trolley sections arranged in substantially end to end relationship, the end portions of adjacent sections being overlapped to permit uninterrupted current flow to a current collector, and means for energizing said trolley sections for normally independent operation, of means for connecting said adjacent trolley sections for operation in parallel when said current collector is changing over from one to the other of said adjacent trolley sections comprising a tie breaker, relay means for controlling the operation of said tie breaker, and means operable in response to changes in trolley current for controlling the operation of said relay means.

6. The combination with an electric railway system including a pair of tracks, a main trolley for each of said tracks, means for energizing each of said trolleys for normal independent operation, a track crossover between said tracks and stub trolleys leading from each of said main trolleys to feed said crossover, of means for connecting said main and stub trolleys for operation in parallel at said crossover when the current collecting device of a locomotive is changing over from one to the other of said stub trolleys at said crossover comprising a tie circuit breaker and means operable in response to changes in current flow in said stub and main trolleys for controlling the closing opening operations of said tie breaker.

7. The combination with an electric railway system including a pair of tracks, a main trolley for each of said tracks, means for energizing each of said trolleys for normal independent operation, a track crossover between said tracks and stub trolleys leading from each of said main trolleys to feed said crossover, of means for connecting said main and branch trolleys for operation in parallel at said track crossover when the current collecting device of a locomotive is changing over from one to the other of said branch trolleys at said track crossover comprising a tie circuit breaker, control relays for controlling the operation of said tie breaker, and means operable in response to changes in current flow in said trolleys for controlling the operation of said control relays.

8. The combination with an electric railway system including a pair of tracks, a main trolley for each of said tracks, means for energizing each of said trolleys for normal independent operation, a track crossover between said tracks and branch trolleys leading from each of said main trolleys to feed said crossover, of means for connecting said main and branch trolleys for operation in parallel at said track crossover when the current collecting device of a locomotive is changing over from one to the other of said branch trolleys at said track crossover comprising a tie circuit breaker and means operable when said locomotive reaches preselected control positions on both sides of said pantograph changeover point for controlling the closing and opening operations of said tie breaker.

9. The combination with a trolley system including a plurality of trolley sections arranged in substantially end to end relationship, the end portions of adjacent sections being overlapped to permit uninterrupted current flow to a current collector, and means for energizing said trolley sections for normally independent operation, of means for connecting said adjacent trolley sections for operation in parallel when said current collector is changing over from one to the other of said adjacent trolley sections comprising a tie breaker, and means actuated by said current collector for controlling the operation of said tie breaker.

10. The combination with a trolley system including a plurality of trolley sections arranged in substantially end to end relationship, the end portions of adjacent sections being overlapped to permit uninterrupted current flow to a current collector, and means for energizing said trolley sections for normally independent operation, of means for connecting said adjacent trolley sections for operation in parallel when said current collector is changing over from one to the other of said adjacent trolley sections comprising a tie breaker, time delay relay means for controlling the operation of said tie breaker and means actuated by said current collector for controlling the operation of said time delay relay means.

11. The combination with a trolley system including a plurality of trolley sections arranged in substantially end to end relationship, the end portions of adjacent sections being overlapped to permit uninterrupted current flow to a current collector, and means for energizing said trolley sections for normally independent operation, of means for connecting said adjacent trolley sections for operation in parallel when said current collector is changing over from one to the other of said adjacent trolley sections comprising a tie breaker, relay means for controlling the operation of said tie breaker, and means disposed at the end portions of each of said adjacent trolleys and operable in response to changes in trolley current for controlling the operation of said relay means.

12. The combination with a trolley system including a plurality of trolley sections arranged in substantially end to end relationship, the end portions of adjacent sections being overlapped to permit uninterrupted flow to a current collector, and means for energizing said trolley sections for normally independent operation, of means for connecting said adjacent trolley sections for operation in parallel when said current collector is changing over from one to the other of said adjacent trolley sections comprising a tie breaker, time delay relay means for controlling the operation of said tie breaker and contactor means disposed in the end portions of each of said adjacent trolleys and actuated by said current collector for controlling the operation of said relay means.

13. In a trolley system including a plurality of energized trolley sections arranged for normal independent operation, means for paralleling adjacent ones of said trolley sections in advance of a changeover from one to the other of said adjacent sections by a current collector, and means for opening said paralleling means after the changeover has been completed to restore said adjacent sections to normal independent operation.

14. In a trolley system including a plurality of trolley sections, said sections being normally energized and operated independently of each other, a tie breaker for connecting adjacent trolley sections in parallel in advance of a changeover from one to the other of said adjacent sections by a current collecting device, and means for opening said tie breaker to restore said adjacent sections to independent operation after said changeover has been completed.

15. In a trolley system, in combination, a pair of adjacent trolley sections, each of said sections being energized and arranged for operation normally independently of one another, means for connecting said sections in parallel while a current collector is making a changeover from one to the other of said sections, and means for restoring said sections to independent operation upon the completion of said changeover.

KARL C. RANDALL.